(No Model.)

R. W. J. KRAUS.
ALARM.

No. 562,731. Patented June 23, 1896.

Witnesses
E. C. Duffy
C. M. Werle

Inventor
R. W. J. Kraus
per
O. E. Duffy
Attorney

UNITED STATES PATENT OFFICE.

ROBERT W. J. KRAUS, OF NEW YORK, N. Y., ASSIGNOR OF ONE-HALF TO JOHN KOSTER, OF BROOKLYN, NEW YORK.

ALARM.

SPECIFICATION forming part of Letters Patent No. 562,731, dated June 23, 1896.

Application filed January 30, 1896. Serial No. 577,365. (No model.)

*To all whom it may concern:*

Be it known that I, ROBERT W. J. KRAUS, of New York, in the county and State of New York, have invented certain new and useful Improvements in Alarms; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention has relation to the class of fire-alarms, and has for its object to instantaneously give an alarm of fire before the fire reaches the state of incandescence.

A further object of the invention is by means of certain mechanism operated by the physical unconsciousness of a living thing, such as a bird or an animal, to give an alarm. For example, a bird being in a cage and a smoldering fire taking place, giving off smoke, or noxious gases arising from such smoldering fire before ignition or incandescence, said bird, becoming unconscious by the effect of the smoke, gases, or heat, will fall from its perch in the cage, and by its weight falling on a plate will cause a circuit to be closed and an alarm located within an engine-house or other place to be sounded. If it be an animal, it will rush from its cage and likewise sound the alarm.

The invention consists in connecting a cage for birds or animals with electric mechanism, so that the falling of an unconscious bird from its perch upon a plate in the bottom of the cage, electrically connected, will cause an alarm to be sounded, or bells to be rung either in an engine-house or other place desired.

When an animal is preferred to a bird, the cage will be made accordingly for its reception, so that when the gases, smoke, or heat get to such a state as will alarm the bird or animal it will plunge through a trap and by its weight in falling upon the plate will close the circuit and ring the alarm.

The drawings hereto annexed simply show one or two devices for carrying my invention into effect.

Figure 1:
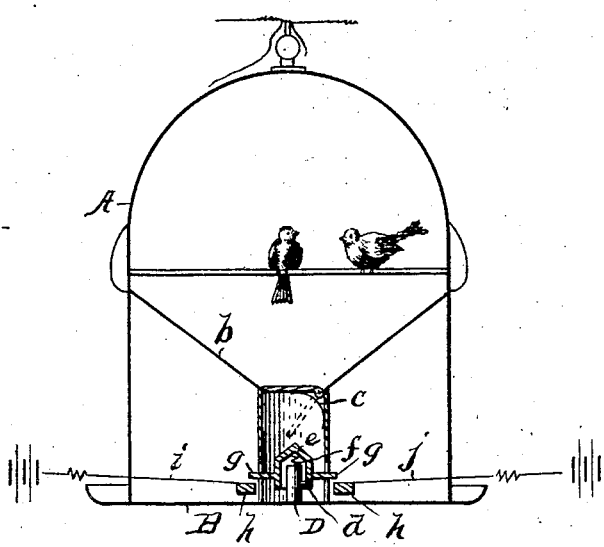
Figure 4:
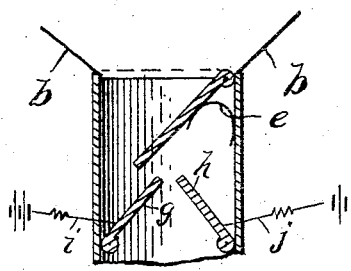
Figure 3:
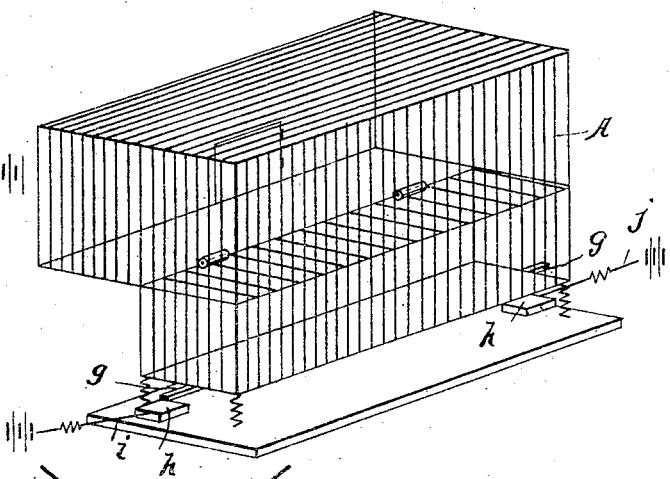
Figure 2:
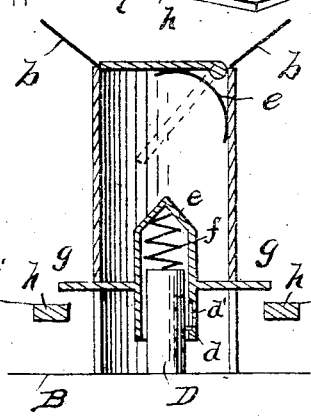

Figure 1 represents a bird-cage of ordinary construction having a depending portion attached to its bottom. In this depending portion I prefer to locate n , electrode attachments and the means of making the electrical connection. Fig. 2 shows an enlarged view in detail of the electrical connection and the means of making the contact. Fig. 3 illustrates another form of cage of such dimensions as to contain animals. Fig. 4 shows a modified form of the electrical connection.

A is the cage, preferably provided with an inclined bottom $b$. This bottom may be of an inverted conical shape, round or square in cross-section, to which is attached a neck or tube space. At the bottom of the cage is located a trap-door hinged at one side, which may be kept in place by a spring $c$ or other device, and below this door, within the tube and resting on the bottom B, I locate a post D, around which I place a sleeve or thimble. The post D is provided with a stop $d$ and a cooperating stop $d'$ on the sleeve or tube. These stops limit the movement of the sleeve in a vertical direction. The top $e$ of said sleeve I make conical or flat and on top of the post a spiral spring $f$. The tension of this spring is made proportionate to the weight of the bird or birds that may fall upon it. At a suitable distance above the bottom of the sleeve on the outside I locate my contacts $g$ $h$, and immediately below these the circuit-wires $i\,j$, so that when the unconscious bird falls on the top $e$ it forces down the sleeve, forcing in turn the electrical contact-points together, thus making connection between $g$ $h$ and $i\,j$, and thence to the alarm, wherever it may be placed. The same principle of operation may be applied to the animal-cage, except that it slightly differs in construction.

For a clearer understanding of the case the operation may be described as follows: The atmosphere in a building being permeated with smoke or gas, the bird will become faint and will fall from its perch on the trap-door, which yields to its weight. The bird then drops to or on top of the sleeve, forcing it down until contact is made and electrical connection completed, when the alarm is sounded. Thus it will be seen that the bird or animal is made to give the alarm just as soon as smoke enters a room, and frequently this occurs before the fire reaches the point of incandescence.

It is well known that seconds and minutes are of great importance to firemen, and if a fire be extinguished in its incipiency it is of great consideration.

Of course I am fully aware that thermostats and many useful contrivances have been used and are in use for instantaneous alarms, but I am not aware that the giving of an alarm has ever before been produced by the physical disability of a living thing affected by gas, smoke, or heat. It may be further stated that this means may be adapted for the saving of the life of a pet bird, and also of human beings by the giving of such early alarm. In large halls or buildings several of these cages may be placed and electrically connected as above described.

In coal or other deep mines it frequently happens that noxious gases arise or are generated and permeate the atmosphere unperceived to the injury of the workmen. With my invention the fainting or physical disability of the bird as it falls from its perch and giving an alarm will be a sure indication of the foul or poisonous atmosphere, when the necessary steps can be taken for its purification. It is certain that the atmosphere that will kill a bird or an animal would be unhealthy for a human being, and it should also be noticed that this same alarm can be employed in mines, &c., to indicate the dangerous condition of explosive gases, so that the necessary steps can be taken in time to overcome them.

In case the bird or animal should faint or be overcome from causes other than gas, smoke, or the like, I can so construct the spring that the tension thereof will require the falling of two or more birds which can be used, so that a certainty of alarm is assured.

What I claim is—

1. The combination of a cage, a barokinetic circuit-closer, and a guide for directing the falling of an unconscious body within the cage upon the circuit-closer substantially as described.

2. An alarm for fire or noxious gases comprising a cage, and a barokinetic circuit-closer adapted to be operated by the falling of an unconscious living thing.

3. A cage having an inclined bottom, a trap-door, and electrodes beneath the door adapted to be operated by a falling body for the closing of a circuit and ringing of an alarm.

In testimony that I claim the foregoing as my own I affix my signature in presence of two witnesses.

ROBERT W. J. KRAUS.

Witnesses:
E. C. DUFFY,
C. M. WERLE.